US008611944B2

(12) United States Patent
Ding et al.

(10) Patent No.: US 8,611,944 B2
(45) Date of Patent: Dec. 17, 2013

(54) METHOD AND SYSTEM FOR CONTROLLING PILOT POWER OF HOME NODEB

(75) Inventors: Tiantian Ding, Shenzhen (CN); Zhong Yu, Shenzhen (CN); Wei Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 158 days.

(21) Appl. No.: 13/145,114

(22) PCT Filed: Dec. 10, 2009

(86) PCT No.: PCT/CN2009/075469
§ 371 (c)(1),
(2), (4) Date: Jul. 19, 2011

(87) PCT Pub. No.: WO2010/083707
PCT Pub. Date: Jul. 29, 2010

(65) Prior Publication Data
US 2011/0275404 A1 Nov. 10, 2011

(30) Foreign Application Priority Data
Jan. 22, 2009 (CN) .......................... 2009 1 0077544

(51) Int. Cl.
*H04B 7/00* (2006.01)
(52) U.S. Cl.
USPC ........................................................ 455/522
(58) Field of Classification Search
USPC ........................................................ 455/522
See application file for complete search history.

(56) References Cited

U.S. PATENT DOCUMENTS

| 7,548,760 | B2 | 6/2009 | Vasudevan et al. |
| 7,746,827 | B2 * | 6/2010 | Xue et al. ...................... 370/332 |
| 2004/0242257 | A1 | 12/2004 | Valkealahti et al. |
| 2007/0060178 | A1 * | 3/2007 | Gorokhov et al. ............ 455/506 |
| 2007/0167183 | A1 | 7/2007 | Vasudevan et al. |

(Continued)

FOREIGN PATENT DOCUMENTS

| CN | 1407819 A | 4/2003 |
| CN | 101188445 A | 5/2008 |

(Continued)

OTHER PUBLICATIONS

International Search Report on international application No. :PCT/CN2009/075469, mailed on Feb. 4, 2010.

(Continued)

*Primary Examiner* — Yuwen Pan
*Assistant Examiner* — Ankur Jain
(74) *Attorney, Agent, or Firm* — Oppedahl Patent Law Firm LLC (57) ABSTRACT

The present invention discloses a method for controlling pilot power of an HNB, comprising: initializing the HNB and setting up communication connection between the HMB and a mobile terminal user, and further comprising: determining a setting type of a current data communication service; increasing current pilot power when the current data communication service is of a first type and a current SNR is less than a predetermined threshold; and reducing the current pilot power when the current data communication service is of a second type and the current SNR is more than or equal to the predetermined threshold. The present invention further provides a system for controlling pilot power of an HNB, which can rationally distribute pilot power resources.

14 Claims, 3 Drawing Sheets

(56) References Cited

U.S. PATENT DOCUMENTS

2009/0111499 A1* 4/2009 Bosch et al. .................. 455/522
2010/0022266 A1* 1/2010 Villier et al. .................. 455/522
2011/0076998 A1  3/2011 Proctor et al.

FOREIGN PATENT DOCUMENTS

EP       1892847 A1    2/2008
WO       0227966 A2    4/2002
WO    2008122824 A2   10/2008

OTHER PUBLICATIONS

English Translation of the Written Opinion of the International Search Authority in international application No. PCT/CN2009/075469, mailed on Feb. 4, 2010.

Supplementary European Search Report in European application number: 09838674.1, mailed on Oct. 29, 2013. (8 pages).

* cited by examiner

METHOD AND SYSTEM FOR CONTROLLING PILOT POWER OF HOME NODEB

TECHNICAL FIELD

The present invention relates to the field of communications, in particular to a method and system for controlling pilot power of a Home NodeB (HNB).

BACKGROUND

With the fast development of a $3^{rd}$ Generation (3G) digital communication technology and the recombination of telecommunication and mobile operators, the operators more and more focus on the seamless access technology and indoor coverage technology for signals in the construction of networks. Good network coverage, particularly indoor coverage, is the key for the fast development of the mobile communications. Under the background of such requirements, an HNB, as a small and low-power base station, has been highly concerned and favored by operators at home and abroad as well as equipment manufactures. On the one hand, the HNB can fast solve the problem of indoor coverage of signals with lower cost, provide a user with a high-speed data communication service and reduce the load of a macro base station; on the other hand, the HNB realizes the combination of fixation and mobility for the operators so as to realize the development of the mobile communications in a family market.

At present, as dedicated resources of private users, the HNB is mainly deployed and applied in indoor places, such as home, school, company, small-scale group area. It can supplement the coverage of an extensive macro cell and provide a user with a high-speed data, voice and multimedia service in the 3G communication system.

The network framework of the HNB mainly includes an HNB and an HNB gateway. The HNB is connected to a core network through the HNB gateway which is in charge of the safety authentication, registration, maintenance management, configuration, and control of the HNB and the like and realizes the data signaling exchanging between the core network and the HNB.

In the HNB, a pilot signal is used for the phase timing of a mobile terminal, the extraction of coherent carrier, the comparison of signal intensity during transition and handover and the like. The pilot signal is ceaselessly sent during the working period of a base station, and the transmit power of the pilot signal, i.e., the pilot power, is about 12% of the total downlink transmit power of a cell in order to ensure that each mobile terminal in the cell can correctly perform demodulation and communication. The increase of the pilot power can expand a signal coverage area, however, overlarge pilot power can cause pilot pollution, interfere pilot signals of other cells, and reduce the power of a downlink service channel of a base station which the cell belongs to, thereby the services supported is reduced due to such effect.

For example, in the HNB, if a pilot signal is leaked out to a room or an area outside the coverage area of the HNB, it will interfere other mobile terminal users in adjacent areas or passing through the area, thereby causing lots of unnecessary mobility events, such as, measurement, cell reselection, handover, and area location update. These mobility events will increase the load of the core network and cause lots of unnecessary signaling interaction between the HNB and the core network.

There are several methods and strategies for controlling the pilot power in the prior art, such as a pilot power fixing method and a pilot power automatically optimizing method. The disadvantage of the pilot power fixing method f is that it is impossible to modify the pilot power timely according to a practical condition and a fixed pilot power is set only when the HNB is initialized and automatically configured. At present, the pilot power automatically optimizing method mainly includes methods for automatically adjusting the pilot power based on measurement, distance and mobility events, but cannot realize the adjustment of the pilot power according to the service types of the mobile terminal.

SUMMARY

In view of this, the present invention mainly aims to provide a method and system for controlling pilot power of an HNB, to solve the problem of leakage of pilot resources due to the irrational distribution of pilot resources.

In order to achieve the aim, the technical solution of the present invention is implemented as follows.

The present invention provides a method for controlling pilot power of an HNB, comprising: initializing the HNB and setting up communication connection between the HMB and a mobile terminal user, and further comprising:

determining a setting type of a current data communication service;

increasing current pilot power when the current data communication service is of a first type and a current Signal-to-Noise Ratio (SNR) is less than a predetermined threshold; and reducing the current pilot power when the current data communication service is of a second type and the current SNR is more than or equal to the predetermined threshold.

Wherein the step of determining the setting type of the current data communication service may comprise:

according to an amount of resources occupied by a data communication service, a data communication service occupying small resources is set as the first type and a data communication service occupying large resources is set as the second type; or according to a Quality of Service (QoS) evaluation value of a data communication service, a data communication service with low QoS evaluation is set as the first type and a data communication service with high QoS evaluation is set as the second type.

When the current data communication service is of the first type, the method may further comprise: keeping the current pilot power at an initial value when the current SNR is more than or equal to the predetermined threshold.

When the current data communication service is of the second type, the method may further comprise: keeping the current pilot power at the initial value when the current SNR is less than the predetermined threshold.

After the current pilot power is increased, the method may further comprise: stopping adjusting the current pilot power according to an adjusted current pilot power when it is determined that the current SNR is more than or equal to the predetermined threshold or the current pilot power is more than or equal to a maximal pilot power;

or continuing increasing the current pilot power when it is determined that the current SNR is less than the predetermined threshold and the current pilot power is less than the maximal pilot power.

After the current pilot power is reduced, the method may further comprise: stopping adjusting the current pilot power according to an adjusted current pilot power when it is determined that the current SNR is less than the predetermined threshold or the current pilot power is less than or equal to a minimum pilot power;

or continuing reducing the current pilot power when it is determined that the current SNR is more than or equal to the predetermined threshold and the current pilot power is more than the minimum pilot power.

The method may further comprise: recovering the current pilot power to the initial value when the communication between the HNB and the mobile terminal user is completed.

The present invention further provides a system for controlling pilot power of an HNB, comprising:

an initialization unit used for initializing the HNB and setting up communication connection between the HMB and a mobile terminal user, a type determining unit used for determining a setting type of a current data communication service and obtaining a determining result, a first determining unit used for determining whether a current SNR is more than or equal to a predetermined threshold and obtaining a determining result according to the determining result of the type determining unit when the current data communication service is of a first type or a second type, and a pilot adjustment unit used for increasing current pilot power according to the determining results of the type determining unit and the first determining unit when the current data communication service is of the first type and the current SNR is less than the predetermined threshold; and used for reducing the current pilot power when the current data communication service is of the second type and the current SNR is more than or equal to the predetermined threshold.

Wherein the initialization unit may be further used for setting the data communication service as the first or the second type according to an amount of resources occupied by the data communication service or a QoS evaluation value, and recovering the current pilot power to the initial value when the communication between the HNB and the mobile terminal user is completed; and the pilot adjustment unit is further used for keeping the current pilot power at an initial value according to the determining results of the type determining unit and the first determining unit when the current data communication service is of the first type and the current SNR is more than or equal to the predetermined threshold or when the current data communication service is of the second type and the current SNR is less than the predetermined threshold.

The system may further comprise:

a second determining unit used for determining whether the current SNR is more than or equal to the predetermined threshold or whether the current pilot power is more than or equal to a maximal pilot power after the current pilot power is increased; and further used for determining whether the current SNR is less than the predetermined threshold or whether the current pilot power is less than or equal to a minimum pilot power after the current pilot power is reduced;

the pilot adjustment unit may be further used for stopping adjusting the pilot power according to a determining result of the second determining unit when the current SNR is more than or equal to the predetermined threshold or the current pilot power is more than or equal to the maximal pilot power, or when the current SNR is less than the predetermined threshold or the current pilot power is less than or equal to the minimum pilot power; and used for continuing increasing the current pilot power when the current SNR is less than the predetermined threshold and the current pilot power is less than the maximal pilot power; and used for continuing reducing the current pilot power when the current SNR is more than or equal to the predetermined threshold and the current pilot power is more than the minimum pilot power.

By the service-based method for controlling pilot power of an HNB of the present invention, the HNB properly adjusts the pilot power according to a specific service type and the current communication quality of the HNB when a user uses different services of the HNB, thereby rationally distributing pilot power resources, reducing the interference in other users which does not use the HNB and increasing the coverage and service efficiency of the HNB; in addition, due to the rational distribution of the pilot power resources, the pilot power is within a rational range, thereby avoiding the leakage of the pilot resources and making the mobile terminal users out of the coverage of the HNB not be influenced by the pilot signal of the HNB, and reducing the occurrence of mobility events, the load of the core network and the signaling interaction between the HNB and the core network.

DETAILED DESCRIPTION

The technical solution of the present invention is further described below with reference to drawings and specific embodiments in detail.

Figure 1:
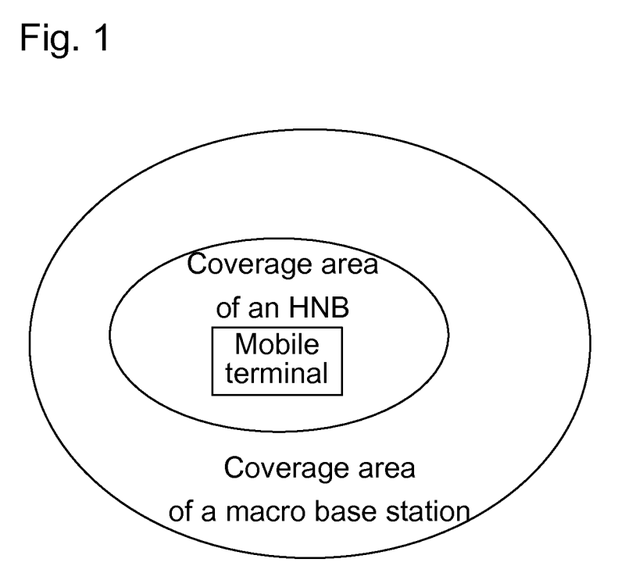
FIG. 1 shows a diagram of an application scenario of a method for controlling pilot power of an HNB in the present invention.

The method for controlling pilot power of an HNB in the present invention is based on services and can distribute pilot power according to a specific service type. As shown in FIG. 1, the present invention mainly applies to the circumstance that a mobile terminal is located in an area covered by both a macro base station and an HNB.

Figure 2:
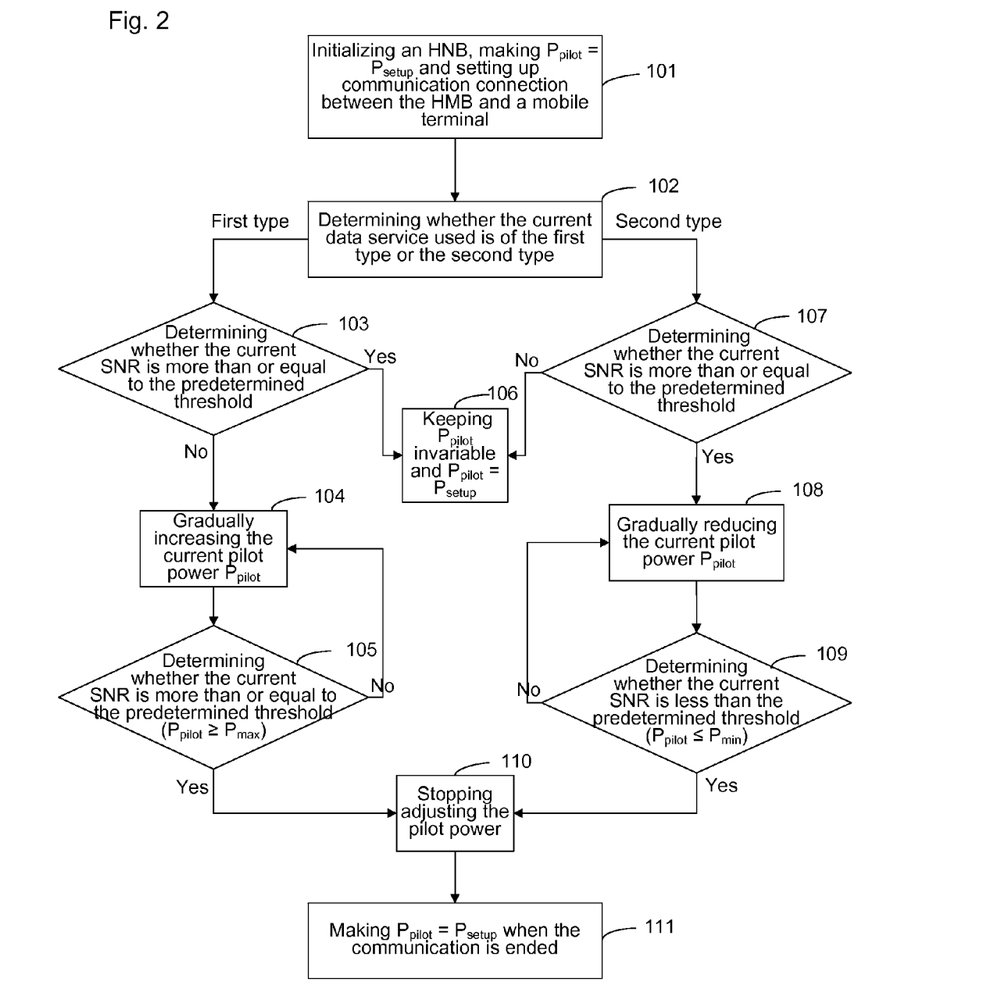
FIG. 2 shows a diagram of the flow of a method for controlling pilot power of an HNB in the present invention.

FIG. 2 shows a diagram of the flow of a method for controlling pilot power of an HNB in the present invention, as shown in FIG. 2, the method comprises the following steps.

Step 101: Initializing the HNB and Setting Up the Communication Connection Between the HMB and a Mobile Terminal.

After the HNB is powered on, initialize settings are performed on the HNB, wherein the pilot power is set with a fixed value $P_{setup}$ setup and can meet 80-90% indoor coverage requirements, for example, when the initialized pilot power is −10 dBm, the coverage of the pilot signal of the HNB can reach 10 m. The pilot power may be set with a current value $P_{pilot}$ and the $P_{pilot}$ is equal to $P_{setup}$ setup upon initialization, i.e., $P_{pilot}=P_{setup}$.

After the HNB is initialized, the communication connection with a mobile terminal is set up. Specifically, by monitoring the pilot power of the HNB from a broadcast channel, and by synchronizing, receiving system information, controlling closed loop power and other steps, a mobile terminal user completes the communication connection with the HNB.

Step 102: Determining Whether the Current Data Communication Service Used is of a First Type or a Second Type, if it is of the First Type, Executing Step 103; if it is of the Second Type, Executing Step 107.

Data communication services used by the mobile terminal user include voice service, video service, web page browsing service, downloading service and other data communication services. According to the amount of the resources occupied by the data communication service, such as bandwidth, and the practical requirements, a threshold of the amount of resources occupied is set; when the amount of resources occupied is less than the threshold, it is indicated that the amount of resources occupied is small; when the amount of resources occupied is more than or equal to the threshold, it is indicated that the amount of resources occupied is large. The data communication service with a small amount of resources occupied is set as the first type; while the data communication service with a large amount of resources occupied is set as the second type, wherein the service of the first type may be named as small-bandwidth service or A-type service, such as voice service and web page browsing service; and the service of the second type may be named as large-bandwidth service or B-type service, such as video service or downloading service.

In addition, a QoS evaluation threshold may also be set according to a QoS evaluation value of the data communication service and the practical requirements; when the QoS evaluation value is less than the threshold, the QoS evaluation is determined to be low; when the QoS evaluation value is more than or equal to the threshold, the QoS evaluation is determined to be high. The data communication service with low QoS evaluation is set as the first type; while the data communication service with high QoS evaluation is set as the second type. It should be noted that, generally, the data communication service with low QoS evaluation occupies a small amount of resources and the data communication service with high QoS evaluation occupies a large amount of resources.

Preferably, a service type corresponding relationship table may be maintained to record the corresponding relationship between the practical communication data service and the setting type.

If a mobile terminal uses the data communication service within the coverage of the HNB, the HNB can determine which setting type the current data communication service belongs to according to the service type corresponding relationship table; if the current mobile terminal is using the voice service, the HNB can know that the voice service belongs to the first type according to the service type corresponding relationship table, and step 103 is executed; if the current mobile terminal is using the downloading service, the HNB can know that the downloading service belongs to the second type according to the service type according to the service type corresponding relationship table, and step 107 is executed.

Step 103: Determining Whether a Current SNR is More than or Equal to a Predetermined Threshold, if so, Executing Step 106, Otherwise, Executing Step 104.

In the present invention, the SNR is the ratio of chip energy Ec to interference power spectrum density Io, i.e., Ec/Io, the predetermined threshold $T_{hreshold}$ is set to ensure the SNR threshold of the signal quality of communications. For the service of the first type occupying a small amount of resources and energy, if the Ec/Io is more than or equal to the $T_{hreshold}$, i.e., (Ec/Io)≥$T_{hreshold}$, it is indicated that noise interference signals do not bring much influence to the current communication quality and the mobile terminal user is within the good coverage of the HNB, so step 106 is executed to keep the current pilot power invariable, i.e., $P_{pilot}=P_{setup}$. If (Ec/Io)<$T_{hreshold}$, it is indicated that much noise interference is brought to the mobile terminal user within the coverage of the HNB, so step 104 is executed.

Step 104: Gradually Increasing the Current Pilot Power $P_{pilot}$.

When (Ec/Io)<$T_{hreshold}$, it is indicated that the current noise interference signals bring much influence to the communication quality and the mobile terminal user is not within the good coverage of the HNB. At this time, it is required to increase the pilot power $P_{pilot}$ in the downlink channel of the cell where the HNB is located to properly increase the coverage density of the pilot signal; and because the service of the first type occupies a small amount of energy and resources, the proper increase of the current pilot power $P_{pilot}$ will not bring influence to the communication and QoS.

Figure 3:
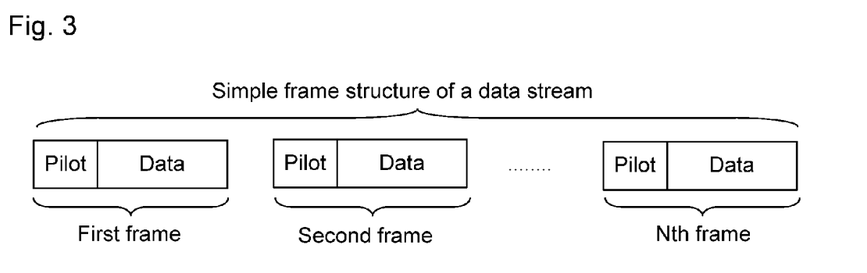
FIG. 3 shows a diagram of the structure of communication data in the present invention.

Data is exchanged between the HNB and the mobile terminal in the form of data stream; a data stream is encapsulate into N data frames, wherein N is a natural number; as shown in FIG. 3, each data frame contains the current pilot power $P_{pilot}$; and when the $P_{pilot}$ is adjusted, it is only required to adjust the $P_{pilot}$ in the second data frame of the data stream.

When the $P_{pilot}$ is increased, it is required to gradually increase the $P_{pilot}$ in the second frame, for example, one step length, i.e., 1 dBm, is increased at a time.

Step 105: Determining Whether the Current SNR is More than or Equal to the Predetermined Threshold, or Whether the Current Pilot Power is More than or Equal to the Maximal Pilot Power, if not, Returning to Step 104, Otherwise, Executing Step 110.

In the process of gradually increasing the $P_{pilot}$, it is required to determine whether Ec/Io is more than or equal to the $T_{hreshold}$, or whether the $P_{pilot}$ is more than or equal to a maximal pilot power ($P_{max}$) every time the $P_{pilot}$ is increased, for example, the $P_{pilot}$ is increased by 1 dBm, wherein $P_{max}$ is the upper limit of the adjustment value of the pilot power.

If the (Ec/Io)≥$T_{hreshold}$, it is indicated that the mobile terminal user is within a good coverage of the HNB after the $P_{pilot}$ is increased; or if $P_{pilot}$≥$P_{max}$, it indicated that the current $P_{pilot}$ has reached or exceeded the upper limit of the adjustment value of the pilot power after the $P_{pilot}$ is increased, at this time, step 110 is executed to stop the adjustment of the pilot power.

If (Ec/Io)<$T_{hreshold}$ and the $P_{pilot}$<$P_{max}$, it is indicated that much noise signal interference is still brought to the mobile terminal user after the $P_{pilot}$ is increased and the current $P_{pilot}$ does not reach the upper limit of the adjustment value of the pilot power and there is still adjustment space, at this time, step 104 is executed again to continue increasing the $P_{pilot}$.

Step 107: Determining Whether the Current SNR is More than or Equal to the Predetermined Threshold, if so, Executing Step 108, Otherwise, Executing Step 106.

For the service of the second type occupying a large amount of resources and energy, if (Ec/Io)<$T_{hreshold}$, it is indicated that the current pilot resources are fully used and there is no redundant pilot energy for adjustment, so step 106 is executed to keep the current pilot power invariable, i.e., $P_{pilot}=P_{setup}$; if (Ec/Io)≥$T_{hreshold}$, it is indicated that the noise interference signals do not bring much influence to the current communication quality and the mobile terminal user is within a good coverage of the HNB, so step 108 is executed.

Step 108: Gradually Reducing the Current Pilot Power $P_{pilot}$.

If (Ec/Io)≥$T_{hreshold}$, it is indicated that the mobile terminal user is within a good coverage of the HNB, at this time, it is required to properly increase the power occupied by data transmission by reducing the pilot power, i.e., by gradually reducing the pilot power $P_{pilot}$ in the second frame. Because the service of the second type occupies a large amount of energy and resources, the transmission speed and QoS of the data communication service will be improved by reducing the pilot power, the system resources can also be saved and the pilot interference in other terminal users outdoor and out of the coverage can be reduced.

In the step of gradually reducing the $P_{pilot}$, one step length, i.e., 1 dBm, may be reduced at a time.

Step 109: Determining Whether the Current SNR is Less than the Predetermined Threshold, or Whether the Current Pilot Power is Less than or Equal to the Minimal Pilot Power, if not, Returning to Step 108, Otherwise, Executing Step 110.

In the process of gradually reducing the $P_{pilot}$, it is required to determine whether Ec/Io is less than the $T_{hreshold}$, or whether $P_{pilot}$ is less than or equal to a minimal pilot power $P_{min}$ every time $P_{pilot}$ is reduced, for example, the $P_{pilot}$ is reduced by 1 dBm, wherein $P_{min}$ is the lower limit of the adjustment value of the pilot power.

If (Ec/Io)<$T_{hreshold}$, it is indicated that the current pilot power has been fully used and there is no redundant pilot resources for adjustment after the $P_{pilot}$ is reduced; or when the $P_{pilot}$ is less than or equal to the $P_{min}$, it is indicated that $P_{pilot}$ has reached or exceeded the lower limit of the adjustment value of the pilot power; at this time, step 110 is executed to stop the adjustment of the pilot power.

If (Ec/Io)≥$T_{hreshold}$ and $P_{pilot}$>$P_{min}$, it is indicated that the mobile terminal user is within a good coverage of the HNB after the $P_{pilot}$ is reduced, at this time, it is required to properly increase the power occupied by the data transmission by reducing pilot power, and the current $P_{pilot}$ does not reach the lower limit of the adjustment value of the pilot power, there is still space for adjustment, at this time, step 108 is executed again to continue reducing the current pilot power $P_{pilot}$ gradually.

Step 111: Making $P_{pilot}$=$P_{Setup}$ after the Communication is Ended.

When the mobile terminal ends the data communication service within the coverage of the HNB, the HNB recovers the $P_{pilot}$ to the initial value, i.e., $P_{pilot}$=$P_{setup}$.

Figure 4:
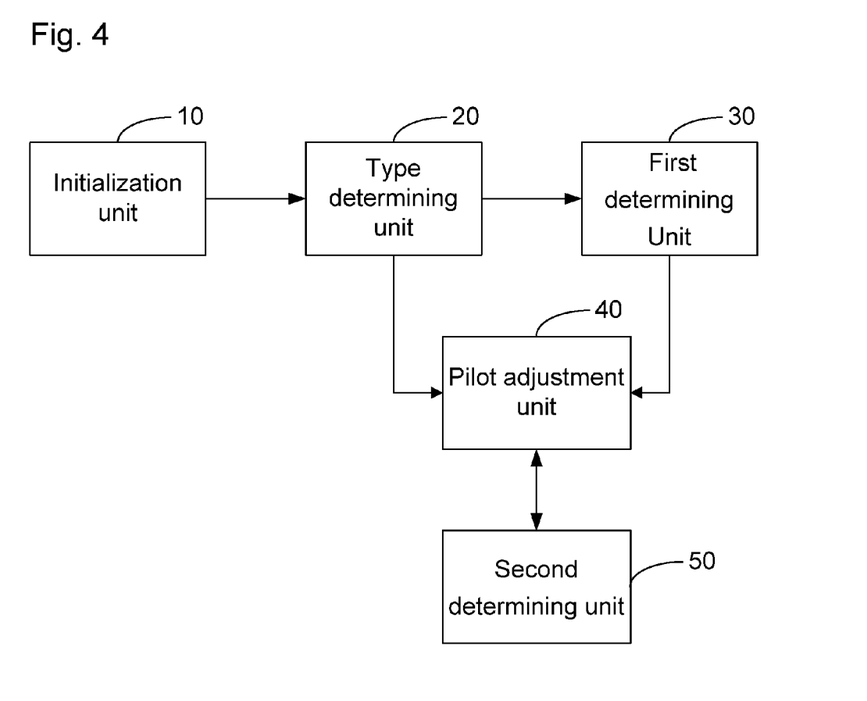
FIG. 4 shows a diagram of the structure relationship of a system for controlling pilot power of an HNB in the present invention.

In order to implement the method for controlling pilot power of an HNB, the present invention provides a system for controlling pilot power of an HNB, as shown in FIG. 4, the system comprises: an initialization unit 10, a type determining unit 20, a first determining unit 30 and a pilot adjustment unit 40.

The initialization unit 10 is used for initializing the HNB and setting up communication connection between the HMB and a mobile terminal user.

The initialization unit 10 is further used for setting the data communication service as the first or the second type according to an amount of resources occupied by the data communication service or a QoS evaluation value, and recovering the current pilot power to the initial value when the communication between the HNB and the mobile terminal user is completed.

The type determining unit 20 is used for determining a setting type of the current data communication service and obtaining a determining result.

The first determining unit 30 is used for determining whether a current SNR is more than or equal to a predetermined threshold and obtaining a determining result according to the determining result of the type determining unit 20 when the current data communication service is of the first type or the second type.

The pilot adjustment unit 40 is used for increasing the current pilot power according to the determining results of the type determining unit 20 and the first determining unit 30 when the current data communication service is of the first type and the current SNR is less than the predetermined threshold, and used for reducing the current pilot power when the current data communication service is of the second type and the current SNR is more than or equal to the predetermined threshold.

Moreover, the pilot adjustment unit 40 is further used for keeping the current pilot power at an initial value according to the determining results of the type determining unit 20 and the first determining unit 30 when the current data communication service is of the first type and the current SNR is more than or equal to the predetermined threshold or when the current data communication service is of the second type and the current SNR is less than the predetermined threshold.

The system further comprises a second determining unit 50 used for determining whether the current SNR is more than or equal to the predetermined threshold or whether the current pilot power is more than or equal to a maximal pilot power after the current pilot power is increased; and further used for determining whether the current SNR is less than the predetermined threshold or whether the current pilot power is less than or equal to a minimum pilot power after the current pilot power is reduced.

Correspondingly, the pilot adjustment unit 40 is further used for stopping adjusting the pilot power according to a determining result of the second determining unit 50 when the current SNR is more than or equal to the predetermined threshold or the current pilot power is more than or equal to the maximal pilot power, or when the current SNR is less than the predetermined threshold or the current pilot power is less than or equal to the minimum pilot power; and used for continuing increasing the current pilot power when the current SNR is less than the predetermined threshold and the current pilot power is less than the maximal pilot power; and used for continuing reducing the current pilot power when the current SNR is more than or equal to the predetermined threshold and the current pilot power is more than the minimum pilot power.

To sum up, what described above are only preferred embodiments of the present invention but not for limiting the scope of protection of the present invention.

The invention claimed is:

1. A method for controlling pilot power of a Home NodeB (HNB), comprising:
   initializing the HNB and setting up communication connection between the HNB and a mobile terminal user, and further comprising:
   determining a setting type of a current data communication service;
   determining whether a current SNR is more than or equal to a predetermined threshold and obtaining a determining result according to the determining of the setting type when the current data communication service is of a first type or a second type,
   increasing current pilot power when the current data communication service is of the first type and the current Signal-to-Noise Ratio (SNR) is less than a predetermined threshold; and
   reducing the current pilot power when the current data communication service is of the second type and the current SNR is more than or equal to the predetermined threshold,
   wherein whether the current data communication service is set as the first type or the second type is dependent on an amount of resources occupied by the current data communication service or a QoS evaluation value,
   wherein the current pilot power is recovered to an initial value when the communication connection between the HNB and the mobile terminal user is completed, wherein the current pilot power is kept at the initial value when the current data communication service is of the first type and the current SNR is more than or equal to the predetermined threshold or when the current data communication service is of the second type and the current SNR is less than the predetermined threshold.

2. The method according to claim 1, wherein the step of determining the setting type of the current data communication service comprises:

according to an amount of resources occupied by a data communication service, a data communication service occupying small resources is set as the first type and a data communication service occupying large resources is set as the second type; or according to a Quality of Service (QoS) evaluation value of a data communication service, a data communication service with low QoS evaluation is set as the first type and a data communication service with high QoS evaluation is set as the second type.

3. The method according to claim 2, further comprising: recovering the current pilot power to an initial value when the communication connection between the HNB and the mobile terminal user is completed.

4. The method according to claim 1, when the current data communication service is of the first type, the method further comprising: keeping the current pilot power at an initial value when the current SNR is more than or equal to the predetermined threshold.

5. The method according to claim 4, further comprising: recovering the current pilot power to the initial value when the communication connection between the HNB and the mobile terminal user is completed.

6. The method according to claim 1, when the current data communication service is of the second type, the method further comprising: keeping the current pilot power at an initial value when the current SNR is less than the predetermined threshold.

7. The method according to claim 6, further comprising: recovering the current pilot power to the initial value when the communication connection between the HNB and the mobile terminal user is completed.

8. The method according to claim 1, after the current pilot power is increased, the method further comprising: stopping adjusting the current pilot power according to an adjusted current pilot power when it is determined that the current SNR is more than or equal to the predetermined threshold or the current pilot power is more than or equal to a maximal pilot power;

or continuing increasing the current pilot power when it is determined that the current SNR is less than the predetermined threshold and the current pilot power is less than the maximal pilot power.

9. The method according to claim 8, further comprising: recovering the current pilot power to an initial value when the communication connection between the HNB and the mobile terminal user is completed.

10. The method according to claim 1, after the current pilot power is reduced, the method further comprising: stopping adjusting the current pilot power according to an adjusted current pilot power when it is determined that the current SNR is less than the predetermined threshold or the current pilot power is less than or equal to a minimum pilot power;

or continuing reducing the current pilot power when it is determined that the current SNR is more than or equal to the predetermined threshold and the current pilot power is more than the minimum pilot power.

11. The method according to claim 10, further comprising: recovering the current pilot power to an initial value when the communication connection between the HNB and the mobile terminal user is completed.

12. The method according to claim 1, further comprising: recovering the current pilot power to an initial value when the communication connection between the HNB and the mobile terminal user is completed.

13. A system for controlling pilot power of a Home NodeB (HNB), comprising:

a Home NodeB;

a mobile terminal user;

an initialization unit used for initializing the HNB and setting up communication connection between the HNB and the mobile terminal user, a type determining unit used for determining a setting type of a current data communication service and obtaining a determining result, a first determining unit used for determining whether a current SNR is more than or equal to a predetermined threshold and obtaining a determining result according to the determining result of the type determining unit when the current data communication service is of a first type or a second type, and a pilot adjustment unit used for increasing current pilot power according to respective determining results of the type determining unit and the first determining unit when the current data communication service is of the first type and the current SNR is less than the predetermined threshold; and used for reducing the current pilot power when the current data communication service is of the second type and the current SNR is more than or equal to the predetermined threshold, wherein the initialization unit is further used for setting the current data communication service as the first type or the second type according to an amount of resources occupied by the current data communication service or a QoS evaluation value, and recovering the current pilot power to an initial value when the communication connection between the HNB and the mobile terminal user is completed; and wherein the pilot adjustment unit is further used for keeping the current pilot power at the initial value according to respective determining results of the type determining unit and the first determining unit when the current data communication service is of the first type and the current SNR is more than or equal to the predetermined threshold or when the current data communication service is of the second type and the current SNR is less than the predetermined threshold.

14. The system according to claim 13, further comprising:

a second determining unit used for determining whether the current SNR is more than or equal to the predetermined threshold or whether the current pilot power is more than or equal to a maximal pilot power after the current pilot power is increased; and further used for determining whether the current SNR is less than the predetermined threshold or whether the current pilot power is less than or equal to a minimum pilot power after the current pilot power is reduced, wherein the pilot adjustment unit is further used for stopping adjusting the current pilot power according to a determining result of the second determining unit when the current SNR is more than or equal to the predetermined threshold or the current pilot power is more than or equal to the maximal pilot power, or when the current SNR is less than the predetermined threshold or the current pilot power is less than or equal to the minimum pilot power; and used for continuing increasing the current pilot power when the current SNR is less than the predetermined threshold and the current pilot power is less than the maximal pilot power; and used for continuing reducing the current pilot power when the current SNR is more than or equal to the predetermined threshold and the current pilot power is more than the minimum pilot power.

* * * * *

UNITED STATES PATENT AND TRADEMARK OFFICE
CERTIFICATE OF CORRECTION

PATENT NO.       : 8,611,944 B2                                       Page 1 of 1
APPLICATION NO. : 13/145114
DATED            : December 17, 2013
INVENTOR(S)      : Ding et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this
Twenty-second Day of September, 2015

Michelle K. Lee
*Director of the United States Patent and Trademark Office*